United States Patent [19]

Remer

[11] 3,883,438

[45] May 13, 1975

[54] ABSORBENT COMPOSITION

[75] Inventor: Robert K. Remer, Evanston, Ill.

[73] Assignee: Hull-Smith Chemicals, Inc., Des Plaines, Ill.

[22] Filed: June 29, 1973

[21] Appl. No.: 374,929

Related U.S. Application Data

[63] Continuation of Ser. No. 129,602, March 30, 1971, abandoned.

[52] U.S. Cl. .......................... 252/1; 8/85; 252/428; 252/438; 260/2.1 R; 260/78.5 T
[51] Int. Cl. ................................................ C09k 3/00
[58] Field of Search ........ 260/78.5 T; 252/428, 438, 252/1

[56] References Cited
FOREIGN PATENTS OR APPLICATIONS
1,029,055   5/1966   United Kingdom

OTHER PUBLICATIONS

Kuzkin et al., Tsvetnye Metally, Vol. 33, No. 2, pp. 17 to 20 (1960).
Blasius et al., J. Chromatog, Vol. 11, pp. 84–92. (1963).

*Primary Examiner*—Leland A. Sebastian
*Attorney, Agent, or Firm*—Lockwood, Dewey, Zickert & Alex

[57] ABSTRACT

This invention provides an absorbent composition comprising a reactant product of (1) amines or amides; (2) carbon disulfide, or carbonyl sulfide; (3) polyvalent metal ions; and, (4) a water-dispersable reactive polymeric material. A water-soluble silicate may be present as an optional material during the reaction. The reaction is carried out in an alkaline water solution or dispersion, and the above noted absorbent composition then precipitates.

The resulting absorbent composition may be used as an ion exchange medium; to form lakes by absorption of dyes soluble or dispersable in water or water-immiscible solvents; to absorb from water solutions or dispersions of toxic or otherwise objectionable materials such as chromates, lead or mercury salts, etc.; to absorb dye intermediates, which when absorbed may be further reacted to form dyes which remain on the composition of this invention; to coat paper and facilitating ink absorption on paper; to manufacture pigments which blend readily in oleophylic vehicles, as well as in hydrophylic vehicles.

12 Claims, No Drawings

ABSORBENT COMPOSITION

This is a continuation of application Ser. No. 129,602, filed Mar. 30, 1971, now abandoned.

This invention relates to an absorbent composition, to a method for its preparation, to novel compositions which can be made utilizing the absorbent composition, and to novel methods of manufacturing azo dyes in the presence of the novel absorbent composition.

It is an object of this invention to provide a novel substrate composition. In this regard, an important object of the present invention is directed to the manufacture of a substrate composition which can be used in the making of new and improved pigments which can be either opaque or transparent.

It is a further object of this invention to provide a substrate which is highly receptive to bonding with dyes and other colorants to form new and improved pigment compositions. It is an additional object of this invention to provide a substrate which can be present during the diazotization and/or coupling of azo dye intermediates to provide either an azo dye intermediate which can be used on a fabric, or the like, or to provide an azo dye pigment in which the azo dye is manufactured in the presence of the substrate and remain on the substrate.

Materials used in the preparation of the composition of this invention are (1) amines or amides; (2) carbon disulfide, or carbonyl sulfide; (3) a multi-valent metal ion; (4) a water-dispersable reactive polymeric material. A water-soluble silicate can be used as an optional material, and if present, has an effect on the particle size of the resulting absorbent composition.

Examples of amines or amides that may be used in accordance with this invention include dicyandiamide; urea; thiourea; 2-alkyl imidazoline in which the alkyl group contains 2 to 22 carbon atoms, particularly such 2-alkyl imidazolines which are also substituted in the first position with a hydroxyethyl group; the amides of fatty acids containing from 2 to 18 carbon atom; ethoxylated amides of such fatty acids; aliphatic amines (primary, secondary, and tertiary, containing up to 20 carbon atoms); aliphatic diamines such as 1, 3 propylene diamine, N-tallow-1, 3 propylene diamine; hydroxy amine such as 2-(2-amino ethoxy)ethanol, amino ethanolamine and monoethanolamine; aniline, toluidine and xylidene; cyclohexylamine and dicyclohexylamine 1, 4-cyclohexane bis(methylamine); phenol diethanolamine; phenol ethanolamine and N-tolyl diethanolamine, and many others. For facilitating distribution in water, these amines are suitably used in the form of salts such as the acetates, diacetates, and the like.

The amount of amine or amide which is used in this invention is not critical, but for most purposes an amount which is at least 5 percent by weight, based on the weight of the polymer which is used.

The amount of carbon disulfide which is used in accordance with this invention is whatever amount is necessary to react with substantially all of the amine or amides. In a preferred embodiment the carbon disulfide is added to the other reaction materials as an aqueous carbon disulfide emulsion. For facilitating the reaction of the carbon disulfide with the amines or amides I have found it convenient, and in some cases necessary (as disclosed hereinafter) to disperse or emulsify the carbon disulfide extremely finely in water, using an emulsifying agent such as water-soluble ethylene oxide-reacted castor oil having a hydroxyl value of 88 and an HLB of 88 (e.g., Baker T.M. Surfactol 365). Suitably 10 parts by weight of this agent may be employed with 100 parts each of water and equal volume of carbon disulfide with agitation to provide a highly reactive suitable carbon disulfide-water emulsion for use in accordance with this invention.

As indicated above the ratio of carbon disulfide to amino or amide is suitably somewhat in excess of that required for complete reaction of all the amine or amide. Simple empirical tests will be described hereinafter for the purpose of further explaining to those with ordinary skill in the art the preferred amounts of carbon disulfide for use in connection with a specific embodiment of the invention.

The water-dispersable reactive polymer compounds for use in accordance with this invention to prepare the novel absorbent composition include commercially available water-dispersable low molecular weight copolymers of styrene and maleic anhydrides (preferably molecular weight typically from 1600 to 2200) and other water-dispersable carboxyl polymeric materials such as rosin acids and salts. It is preferred that the carboxyl polymeric materials be selected from those high molecular weight materials or polymeric materials which have one or more aliphatic unsaturations therein, e.g., rosin acids, abeitic acid, maleic and acrylic polymers and copolymers, metal cross-linked acrylic copolymers, styrene copolymers, and the like. Also included within the class "water-dispersable reactive polymer compounds" are water or ammoniacal dispersable expoxy, polyamide, polyester, cellulosic, e.g., alpha cellulose, natural amino-containing proteinaceous materials such as gelatin, soya protein, casein, and the like. The amount of the water-dispersable reactive resinous resin compound used in accordance with this invention is not critical although it is preferred that the weight of the resin compound be greater than the combined weight of the amine compound and carbon disulfide. More preferably the amount of resin compound which is used is substantially greater then, e.g., 2–10 fold greater than, the weight of the precipitated materials. Naturally, when the novel absorption material of this invention is produced in the presence of a dye or dye intermediate, those embodiments utilizing greater weight of water-dispersable reactive polymer materials will result in pigments of relatively lower color value.

These water-dispersable or ammoniacal dispersable resin materials are widely available commercially in the form of powders, and it is preferred that this ingredient be added to the aqueous system, in the method of manufacture of this invention, in the form of a relatively fine powder.

The multi-valent metal ions which are provided in the method in accordance with this invention can be selected to provide either opaque or transparent substrates, as desired, in accordance with the requirements of the final product. Typically, these multi-valent metal ions can include, for example, aluminum, zirconium, strontium, zinc, lead, molybdenum, tungsten, phosphomolybdate, barium, copper, cadmium, and other polyvalent ions.

When aluminum sulfate is added to the reaction system in aqueous solution the resulting absorbent composition will be transparent. When a solution of a soluble barium salt is precipitated with a solution of aluminum sulfate in the reacting medium of this invention, a highly transparent substrate, containing a product known as blanc fixe is produced. However, if zinc chloride, zirconium oxychloride, lead nitrate, etc., are used the resulting substrate will be opaque. Furthermore when zirconium oxychloride, zinc chloride, lead nitrate, etc., are used, the resulting substrate composition is not capable of being resolubilized in alcohol, etc. However when alumina hydrate is used the resulting substrate system is soluble in alcohols or amines and can be resuspended in methylethylketone, acetone, propylene glycol, etc., for use in the manufacture of rotogravure ink, and the like. Also, essentially phosphorescent metal pigments utilizing zinc, copper cadmium ions, etc., in accordance with this invention, in conjunction with any of the basic fluorescent dyes, UV absorber dyes, optical bleaching dyes, and the like provide a material which is highly useful as coating compositions in the manufacture of television screens, and the like. It should be emphasized, however, that the transparent pigments referred to above are produced in a method utilizing alumina hydrate, and that if aluminum silicate is added the resulting substrate will be opaque.

Some polyvalent metal ions are known to form inorganic gel polymer systems in water, e.g., alumina hydrate in water, and such polymeric materials are contemplated to be equivalent to the reactive organic polymeric materials referred to hereinbefore as illustrative of that category of ingredients for use in accordance with this invention. Therefore, in some embodiments of this invention, some or all of the water-dispersable reactive polymeric material can be supplied in the form of inorganic polymeric hydrates such as alumina hydrate, gel-forming clays, and other inorganic water-dispersable polymeric materials.

The aqueous reaction solution is alkaline, and the metal polyvalent ions are preferably added to such solution in the form of a slightly acidified aqueous solution of the metal polyvalent ion. The preferred aqueous reaction solution of this invention is ammoniacal and the ammonium hydroxide can provide some or most of the amine ingredient referred to hereinbefore.

In methods of manufacture of this invention, which will be further described with the aid of the examples herein, substantially quantitative recover of organic solid materials is achieved. The reactions are carried out in aqueous systems, and dyes or dye intermediates can be added to the reaction system at any one of a number of stages of the manufacture of the substrate of this invention. For example, in accordance with this invention, a color-free finely divided substrate can be produced in an alkaline aqueous system from which the substrate is derived as a precipitate.

In an alternative embodiment of this invention, the polyvalent metal ion, the water-dispersable reactive resin material, the amine compound, sodium silicate, are admixed and a dye or dye intermediate is also added to this mixture, and a colored substrate of this invention is precipitated after the addition of carbon disulfide and additional polyvalent metal ions.

In another alternative embodiment, the polyvalent metal ions, and water-dispersable reactive resin material, the amine compounds, and carbon disulfide are admixed in an alkaline aqueous system to provide an aqueous suspension of the fine color-free substrate of this invention, and a dye or dye intermediate can be added directly to the suspension for substantially complete absorption of the dye or dye intermediate thereon. On the other hand the color-free finely divided aqueous suspension of the absorbent composition of this invention can be separated from the aqueous reaction liquor, and the solids separated by decantation, filtration. The solids can be washed in water. In another alternative embodiment of this invention the resulting separated, color-free, washed, finely divided solids can be resuspended and admixed with dye or dye intermediate for complete absorption of the dye or dye intermediate thereon.

The color-free separated solids of this invention are relatively heat stable and can be heated to temperatures at least as high as 400°F, without disintegration or degradation and can be heated to temperatures of about 300°F for the purpose of drying the solids to provide a substantially dry substrate. However, the colored substrate produced in accordance with this invention can be used as aqueous-wet filter cake by admixing with lipophylic vehicles and flushing the water therefrom using conventional techniques such as, for example, by heating the resulting admixture.

On the other hand, dry colored substrates in accordance with this invention are found to be surprisingly dispersable in lipophylic vehicles such as alkyd varnishes, nitro cellulose laquers, and the like. As indicated above, such admixtures produced from absorbent compositions of this invention utilizing alumina hydrate produce transparent inks, whereas such compositions produced from embodiments of this invention utilizing zirconium oxychloride in the aqueous reaction system produce opaque inks.

In the following examples all parts are expressed in parts by weight, and all percentages or percent (percent) are expressed in percent by weight based on the weight of the mixture, unless otherwise indicated, and all temperatures are expressed in degrees Fahrenheit. The following examples are provided for the purpose of illustration only, and it is not intended that the invention be limited thereto. For example, other reaction temperatures can be employed. Carbon disulfide is added at 100°–110°F in the examples, but can be added at lower temperature, or at higher temperature, provided the system is equipped to reflux vaporized carbon disulfide, or is pressurized, or otherwise equipped to retain the carbon disulfide.

EXAMPLE 1

Tap water (4000 parts) and concentrated sodium silicate solution (50 parts) are admixed and a small amount of silicone anti-foam material (T.M. Anti-Foam-60) is added thereto. The resulting sodium silicate solution is heated to 160°F and a low molecular weight maleic anhydride-styrene copolymer (500 parts) is added with 100 rpm high shear mixing. The maleic anhydride-styrene copolymer used in this example is commercially available material (SMA 17352 A, T.M. Arco Chemical) which is available in powder form. The molecular weight of the material is 1590–1890, its acid number is about 260; melting point 160°–170°F. After about 25 minutes of mixing good dispersion is formed and 68 parts of 26°Baume ammonium hydroxide solution is added thereto. Mixing is continued for five minutes and an additional 68 parts of the ammonium hydroxide solution are added and mixing is continued for 20 minutes. 100 parts by weight of dicyandiamide is added to provide "Mixture A".

Separately, a diamine N-Tallow propylene diamine diacetate, (T.M. Adogen 570-A (100 parts) is melted. In this condition it has the appearance of coconut oil. This material is added when melted to Mixture A to produce a mixture identified hereinafter as Mixture B.

An aluminum sulfate solution is separately prepared by dissolving 150 parts of aluminum sulfate with 1800 parts of water. A portion of the aluminum sulfate solution (1000 parts) is added to the material identified as Mixture B, fairly slowly, and the resulting admixture is cooled to about 100°F. The resulting mixture is rather thick and upon continued stirring gradually becomes somewhat less viscous, and is referred to hereinafter as Mixture C.

In a separate container 127 parts of carbon disulfide, 100 parts of water (equal volumes), and 10 parts of a surfactant (Surfactol 36 TL-3-30, T.M. Baker, which is castor oil-derived surfactant) is admixed and agitated to form a milky white emulsion.

The resulting emulsion is then added to Mixture C and an extreme thickening occurs and new particles are formed. There is no odor of carbon disulfide at all coming from the resulting admixture. The remaining 800 mils of the aluminum sulfate solution is now added and substrate solids form. The resulting admixture shall be referred to hereinafter as the substrate suspension.

EXAMPLE 2

The purpose of this example is to illustrate the production of a colored substrate in accordance with this invention. Azosol Brilliant Yellow (20 parts) (8 GF), methyl cellosolve (300 parts) are admixed and heated to solubilized dye. The dye is an azo dye that is classified as an oil-soluble acid dye.

The resulting admixture referred to hereinafter as the dye solution of Example 2, is admixed with the "substrate suspension" (3500 parts) referred to in Example 1. The color went onto the substrate immediately and when a portion of the colored material was added to filter paper the filtrate was colorless showing complete bonding of the dye to the substrate, and no "bleeding". Upon filtration and washing a dry pigment powder is produced without grinding upon drying at 300°F.

EXAMPLE 3

The purpose of this example is to illustrate the use of the substrate produced by Example 1 with a basic dye. Rhodamine F3B is an extremely brillant dye. The Rhodamine dye (10 parts) and methyl cellosolve (300 parts) are admixed and heated to approximately 100°F to facilitate solubilizing of the dye. The resulting solution of the Rhodamine dye referred to hereinafter as the Rhodamine dye solution was admixed to substrate produced as in Example 1. Imediately upon admixing, color was imparted to the substrate, and when applied to filer paper there was no bleed whatsoever through the filter paper.

EXAMPLE 4

The procedure of Example 1 is repeated, except that prior to the addition of the carbon disulfide solution a dye solution produced in accordance with Example 2 was added to the reaction mixture. Upon addition of the carbon disulfide as in Example 1 thereto, the resulting substrate was colored, and evidenced no bleed upon being tested on filter paper.

EXAMPLE 5

The procedure of Example 1 was repeated except that immediately prior to the addition of the carbon disulfide emulsion, the Rhodamine dye solution of Example 3 was added thereto. Upon addition of the carbon disulfide emulsion a colored substrate was produced, and no bleed was observed when the substrate was tested on filter paper.

EXAMPLE 6

The purpose of this example is to illustrate the incorporation of a diazo type dye intermediate on the substrate of the invention, and the subsequent coupling in the presence of the substrate to produce diazo dye colored substrate of this invention.

Water (4000 parts) is heated to 160°F and concentrated sodium silicate (50 parts), a silicone emulsion anti-forming agent (5 parts) (GE Silicone Anti-Foam 60) and SMA resin (previously described in Example 1) (50 parts) are admixed therewith and shear-blended thoroughly. Ammonium hydroxide (135 parts 26°Be) is added and stirring is continued for about 25 minutes for complete solubilization of the resin. To the resulting mixture dicyandiamide (20 parts) and "Monazolene O" (50 parts) are added thereto. Monazolene O is a surface active 1-hydroxyethyl 2-alkylimidazoline in which the alkyl is an unsaturated 17 carbon chain. Paranitroaniline (200 parts) is added thereto and mixing is contined for 10 additional minutes. The resulting mixture is referred to hereinafter as mixture 6-A.

An aluminum sulfate (iron-free) solution is prepared separately by dissolving 150 parts of aluminum sulfate in 1800 parts of water at 120°F. To this, 46 parts of sulfuric acid diluted with 175 parts of water are added. The resulting admixture is referred to hereinafter as the aluminum sulfate solution.

A portion of the aluminum sulfate solution (1000 parts) is added to the Mixture 6-A and the resulting admixture is cooled to 100°F and the cooled solution is referred to as 6-B hereinafter.

Carbon disulfide emulsion (237 parts) is prepared separately by admixing 127 parts of carbon disulfide, 100 parts of water, and 10 parts of Surfactol 36 T (L-330, T.M. Baker, a castor oil-derived surfactant). The resulting emulsion is added to Mixture 6-B. Thereafter, another portion of the aluminum sulfate solution (1000 parts) is added to bring the total volume to about 7000 parts by volume, and the entire volume is transferred to a larger container and cooled to 50°F by addition of ice thereto. The cooled solution is referred to hereinafter as Mixture 6-C.

The following solution is prepared for the diazotization of the substrate produced herein. To a solution of concentrated hydrochloric acid (358 parts) in 600 parts of water, 100 parts of sodium nitrite dissolved in 400 parts of water is added. The resulting mixture is thoroughly mixed with Mixture 6-B and tested. After the diazotizing reaction is complete, the mineral acid is neutralized. To neutralize excess mineral acid, sodium acetate (250 parts) is dissolved in water (400 parts). This solution is added to the sodium nitrite solution until neutral congo red paper test is observed. The resulting mixture is referred to in this example as the diazo substrate.

COUPLING 6-I

Naphthol AS Supra(gaf) (100 parts) is pasted with methyl cellosolv or alcohol (150 parts). Sodium hydroxide (40 parts) dissolved in water (700 parts), the sodium hydroxide solution is added to the naphthol solution and the resulting admixture is heated to 180°F. The resulting admixture forms a clear solution. The resulting admixture is diluted with water to bring the weight of the batch to about 1800 parts.

The resulting naphthol solution is added to a batch of diazo substrate produced in accordance with this example, and mixed 30 minutes. The resulting admixture is filtered and washed and filtered again to provide a colored substrate which evidences no bleed in a filter paper test.

COUPLING 6-II

Methocellosolv (200 parts) is admixed with Monazoline O (which was described earlier) (50 parts) and the resulting admixture is heated to 180°F. The heated admixture is added to beta-naphthol (200 parts) and a clear solution results. Water is added to the resulting solution to bring the batch to 1800 parts, and this procedure was used in accordance with the procedure of this example as described under Coupling 6-B.

EXAMPLE 7

The purpose of this example is to illustrate another use of the method of this invention to produce a colored substrate or pigment. To water at 120°F (4000 parts) concentrated sodium silicate solution (100 parts) and ammonium hydroxide solution (28°C Be) (112 parts) and thoroughly mix. An ammonia-dispersable resin which is commercially available under the trade name "Pentalyn 261" (500 parts) is added thereto and mixed therein with high shear blending. This ammonia-dispersable resin is a high acid number, pale rosin-derived synthetic resin. It has an acid number in the range 196–210, a softening point (drop method) 165°–175°C and is available as a water white powder. It is noted that abietic acid which is a major constituent of rosin acid is a complex high molecular weight acid having a carboxyl group and two aliphatic type unsaturations per molecule. The resulting admixture is heated to 170°F and Monazoline O (100 grams, which was described hereinbefore, is admixed and stirred until fully dissolved.

When the previously added ingredients are fully dissolved Hiltacid Blue liquid (60 parts) is added thereto and mixed therewith for approximately 5 minutes. The resulting admixture is cooled to a temperature in the range 100°F–110°F. A carbon disulfide emulsion (one-half of the emulsion prepared as in Example 1), is added and allowed to react for approximately 10 minutes.

The resulting admixture is referred to hereinafter as mixture 7-A.

In a separate container an aluminum sulfate solution is prepared by admixing aluminum sulfate (75 parts) in water (200 parts) at 120°C and admixing therewith a dilute sulfuric acid solution prepared by diluting concentrated sulfuric acid (138 parts) with 525 parts of water.

To the mixture identified hereinbefore as solution 7-A the aluminum solution is added over a period of about 20 minutes, and the resulting mixture is heated to approximately 160°F after that time. The resulting mixture is then cooled, decanted, and the recovered solids are washed and filtered.

EXAMPLE 8

The purpose of this example is to illustrate an alternative embodiment for the production of a substrate in accordance with this invention which is particularly useful in connection with acid dyes.

To water at 140°F (4000 parts), concentrated sodium silicate aqueous solution (100 parts) SMA resin (described hereinbefore) (500 parts) are admixed and under high shear blend conditions for 5 minutes. An aqueous ammonium hydroxide (26°Be) (135 parts) is added thereto and the high shear blending is continued until complete solution of the previously added ingredients is achieved. N-tallow 1-3 propyldiamine (commercially available as "Adogen 570 A", T.M. Ashland Chemical Company) (100 parts) is melted and added thereto. The resulting mixture is referred to hereinafter as Mixture 8-A.

A zirconium oxychloride solution is prepared by dissolving zirconium oxychloride (150 parts) in water (1800 parts) at 70°F. A portion of the zirconium chloride solution (900 parts) is added to the mixture previously identified as Mixture 8-A and the resulting admixture is cooled to a temperature in the range 100°–110°F. To the cooled solution a carbon disulfide emulsion (100 parts), prepared as described in Example 1, is added with stirring. No odor of carbon disulfide was detected emanating from the mixture. The remaining portion of the zirconium solution (900 parts) is added with mixing. The resulting reaction mixture was permitted to settle, was decanted, and the recovered solids were washed and filtered. The filter cake was divided into 4 parts and one of the parts was used as follows.

A zirconium chloride solution is prepared by dissolving zirconium oxychloride (25 parts) in water (1800 parts) at 70°F, and a fourth of the filter cake produced in Example 8 hereinbefore was resuspended therein. Hiltacid Blue (30 parts) was added to the resulting suspension and the resulting admixture was heated 170°F. All of the dye was immediately absorbed on the suspended solid substrate of this invention. No bleeding was observed when a portion of the suspension was tested on filter paper. The resulting suspension was cooled and the solids were permitted to settle. After decantation and washing the solids were recovered by filtration.

EXAMPLE 9

The purpose of this example is to further illustrate the use of the solid substrates in accordance with this invention in the production of the substrate of this invention with Rhodamine dyes.

One-half of the filter cake produced in Example 8 is suspended in water (2000 parts) and the resulting suspension is heated to 160°F. In a separate container Rhodamine B (5 parts), Rhodamine 6 GDN (5 parts) and methyl cellosolve (100 parts) is admixed to dissolve the dye. The resulting dye solution is admixed with the heated substrate suspension at 160°F. Immediately upon blending the dye is removed from the water and uniformly and completely absorbed on the suspended substrate solids. The resulting mixture is thereafter permitted to settle, and after decantation, the solids are washed and filtered.

EXAMPLE 10

This example illustrates the use of the absorbent composition of this invention to produce pigments. To water at 140°F (4000 parts) aqueous sodium silicate (50 parts), SMA resin previously described (500 parts), dicyandiamide (100 parts), aqueous ammonium hydroxide (26°Be) (135 parts), Monazoline O (50 parts), previously described are admixed and shear blended until the resin is dissolved. The resulting admixture is identified hereinafter as Mixture 9-A.

In a separate container an aluminum sulfate solution is prepared by dissolving aluminum sulfate (150 parts) in water (1800 parts) at 140°F. To the resulting solution, glacial acetic acid (50 parts), diluted with water (50 parts), is added.

A portion of the resulting aluminum sulfate solution (950 parts) is added to the mixture identified hereinbefore as Mixture 9-A, and the resulting admixture is cooled to a temperature in the range 100°–110°F. To the cooled solution carbon disulfide emulsion (100 parts), prepared as in Example 1, is added with stirring. No odor of carbon disulfide was observed emanating from the reaction mixture. The remaining portion of the aluminum sulfate solution (950 parts) was added and the resulting admixture was permitted to stand for approximately 1/2 hour prior to decantation. The resulting collected solids were washed with water and filtered.

The filter cake is divided into substantially two equal parts. The first half of the filter cake is dispersed in water (2000 parts) at 140°F and a mixture made up from methyl cellosolve (300 parts) and Azosol Yellow 8GF (20 parts) is added thereto. The dye solution, when added to the suspended filter cake is found to be immediately dispersed and immediately the dye is observed to be absorbed on the suspended solids.

The other half of the filter cake is suspended in water (2000 parts) at 140°F. A dye solution prepared by admixing Rhodamine B (5 parts), and Rhodamine 6GN (5 parts) in methyl cellosolve (200 parts) and heated to solubility of dye. The resulting dye solution is filtered to remove fines and is added to the suspended color filter cake. The Rhodamine-colored filter cake and the Azosol yellow filter cake dispersions are admixed and thoroughly dispersed, and filtered and dried.

EXAMPLE 11

The purpose of this example is to illustrate the use of zinc chelate in the production of the absorbent composition of this invention. To water (4000 parts) at 140°F, concentrated aqueous sodium silicate solution (50 parts), SMA resin (500 parts), aqueous ammonium hydroxide (26°Be) (135 parts) are added and shear blended to bring about solubilization of the resin. To the resulting suspension dicyandiamide (100 parts), and N-tolyl 1-3 propyl diamine (50 parts) are added. The resulting admixture is cooled to a temperature in the range 100°–110°F, and the cooled mixture is identified hereinafter as Mixture 11-A.

In a separate container a zinc solution is prepared by dissolving a zinc chelate (80 parts) in water (1800 parts) at 140°F. To the resulting chelate solution a mixture of glacial acetic acid (106 parts) and tap water (100 parts) are admixed.

A portion of the resulting chelate solution (1000 parts) is added to the mixture identified above as Mixture 11-A and the resulting admixture is cooled to a temperature 100°–110°F. A carbon disulfide emulsion (100 parts) is introduced at the bottom of the resulting reaction liquor and no odor of carbon disulfide was observed emanating therefrom. The remaining portion of the chelate solution (1000 parts) is added to the reaction mixture, and after approximately 20 minutes the solids were permitted to settle, the supernatent liquid was decanted therefrom, the solids were washed in watger, and recovered as a filter cake by filtration.

EXAMPLE 12

The purpose of this example is to illustrate the production of a blaze red pigment. To water at 140°F (4000 parts) aqueous sodium silicate (50 parts), Hiltamine Acetic White DML (20-1569) (2 parts), uvinal (DS-49) (2 parts) are added and shear blended for one minute; SMA resin (500 parts), an effective but small amount of an anti-foam (G.E. Anti-Foam 60), and aqueous ammonium hydroxide solution (26°Be) (135 parts) are admixed and shear blended 20–30 minutes until complete solubilization of the resin is achieved. To the resulting admixture dicyandiamide (100 parts) and Monazoline O (50 parts) are admixed and the resulting mixture is stirred for approximately 5 minutes. The resulting mixture is identified hereinafter as Mixture 12-A. In a separate container an aluminum sulfate solution is prepared by dissolving aluminum sulfate (150 parts) in water (1800 parts) at 120°F. To this aluminum sulfate solution a sulfuric acid solution, prepared by admixing concentrated sulfuric acid (92 parts) diluted in water (150 parts), is added at 60°F.

A portion of the resulting aluminum sulfate solution (800 parts) is added slowly to the mixture identified hereinbefore as Mixture 12-A to allow the pigment solids to form. After complete addition of the portion of aluminum sulfate a dye solution is added to the resulting mixture (identified hereinafter as Mixture 12-B).

The dye solution is prepared by dissolving Rhodamine 6 GDN (14 parts), Rhodamine B (14 parts) dissolved in methyl cellosolve (200 parts) and by heating the mixture to 150°F. The dye solution is added to the mixture identified above as Mixture 12-B and the mixture is heated to 150°F. The resulting admixture is cooled to a temperature in the range 100°–110°F and a carbon disulfide emulsion (100 parts), prepared as described in Example 1, is then added. The remainder of the aluminum sulfate solution (1,200 parts) is added slowly in 200 part increments to the resulting admixture. The solids are then separated by filtration.

The above procedure is repeated to provide a second filter cake except that all of the dye ingredients are eliminated from the second procedure, and the resulting reaction mixture is not filtered. A portion of the resulting second reaction mixture (3,000 parts) are admixed with an Azosol Fast Yellow HGF dye (24 parts) dissolved in methyl cellosolve (300 parts) and the substrate suspension-dye solution is heated to 150°F. Thereupon one-half of the colored filter cake referred to hereinbefore in this example is admixed with the heated suspension.

EXAMPLE 13

To water (4000 parts) at 140°F, concentrated aqueous sodium silicate (50 parts), SMA resin (500 parts) described hereinbefore, aqueous ammonium hydroxide (26°Be) (135 parts) are admixed and shear blended to wet-out the resin. The resulting mixture is identified hereinafter as Mixture 13-A. In a separate container an aluminum sulfate solution is prepared by admixing aluminum sulfate (150 parts) with water (1600 parts) and to the resulting aluminum sulfate solution a diluted sulfuric acid is added. The diluted sulfuric acid is prepared by diluting concentrated sulfuric acid (46 parts) with water (175 parts).

A portion of the aluminum sulfate solution (400 parts) is added to the mixture identified as Mixture 13-A, and dicyandiamide (100 parts) Monazoline 0 (50 parts) an additional portion of the alulminum sulfate solution (400 parts) is added. The resulting admixture is cooled to a temperature in the range 100°–110°F and carbon disulfide in emulsion (100 parts), prepared as in Example 1, is added thereto. The remainder of the aluminum sulfate solution (800 parts) is added to the resulting admixture. The suspension of finely divided solids is mixed thoroughly and divided into two equal portions. One-half of the above batch is permitted to settle, is washed, and filtered to become solids as a filter cake. The resulting filter cake is resuspended in water (120°F) (2000 parts) and Rhodamine 6GDN-6018 BAGF (30 parts) is added thereto to form a Rhodamine colored suspension.

To the other half of the batch a dye solution is added. The dye solution is prepared by dissolving Azosol Yellow 8 GF (15 parts) in methyl cellosolve (200 parts). The Rhodamine-colored suspension and the Azosol Yellow suspension are then admixed to produce blaze orange, in accordance with this invention.

EXAMPLE 14

To water (4000 parts) heated to 160°F, Pentalyn 261 resin (500 parts), aqueous ammonium hydroxide (26°Be) (156 parts) are admixed under high shear conditions. This resulting mixture is referred to hereinafter as Mixture 14-A.

In a separate container Monazoline 0 (100 parts), cyclohexylamine (100 parts), methyl cellosolve (100 parts), and beta-naphthol (400 parts) are thoroughly admixed until a substantially homogeneous dispersion is achieved. The resulting homogeneous dispersion is admixed with the mixture referred to above as Mixture 14-A.

The resulting admixture is referred to as Mixture 14-B.

In another container an aluminum sulfate solution is prepared by dissolving 150 parts of aluminum sulfate in 1800 parts of water at 120°F. To this solution, a dilute sulfuric acid is prepared by dissolving 46 parts of concentrated sulfuric acid in 175 parts of water at 70°F. A portion of the aluminum sulfate solution (900 parts) is added to the mixture identified above as Mixture 14-B. Carbon disulfide emulsion (300 parts) prepared as in Example 1 is then admixed with the solution and finally the balance of the aluminum sulfate solution is added thereto. Substantially quantitative recovery of the organic materials was achieved as finely divided settled solids. The resulting dispersion was permitted to settle, the supernatent liquid was decanted, and the solids were washed with water and resuspended in water (6000 parts). In a separate container concentrated hydrochloric acid (300 parts) is dissolved in water (3000 parts) and the acid solution is cooled to about 50°F by addition of ice thereto. In a separate container paranitroaniline (200 parts), sodium nitrite (80 parts), and water (400 parts) are admixed and heated to 180°F. A paste is formed and the resulting paste is added to the cooled hydrochloric acid referred to above and the temperature is maintained at approximately 50°F by addition of ice, if necessary. It will be apparent to those of ordinary skill in the dying art that the paranitroaniline is being diazotized and the diazotization reagents and conditions are conventional. After the diazotization is complete the inorganic acid is neutralized by addition thereto of a solution prepared by dissolving sodium acetate (125 grams) in water at 120°F (500 parts) and subsequent addition thereto of glacial acetic acid (50 parts). The diazotizing solution is neutralized to congo red neutral. The resulting neutralized solution is referred to as the coupling solution.

Cotton fabric is drawn through the naphthol solution of this example and excess liquid is wrung therefrom. The thus treated fabric is then passed through the diazo solution and the red color is instantly developed. It has been found that the procedure of this example is eminently satisfactory for use in dyeing or printing on, any textile fabric including cotton, nylon, wool, silk, etc. It should be emphasized that the diazotizing and coupling reactions which are used in accordance with this invention utilize entirely conventional diazotizing and coupling conditions, and diazotizing and coupling of the intermediate present with or absorbed on the substrate of this invention appears to take place at an accelerated rate. It has been found that any of the azo dye intermediates can be diazotized and coupled with any of the naphthol or amine azo dye intermediates which are well known and conventionally used, and that no special accomodation is necessary because of the presence of the substrate of this invention during the diazotizing or coupling.

EXAMPLE 15

The procedure of Example 1 is repeated, except that dissolved lead nitrate is substituted for a portion of the aluminum sulfate. The resulting washed substrate is then admixed with a chromate solution and color is immediately developed on the substrate.

EXAMPLE 16

To water (4000 parts) at 160°F a concentrated aqueous solution of sodium silicate (50 parts), a small amount of anit-foam agent (T.M., G.E. Anti-Foam 60) and a rosinderived ammonia-dispersable resin referred to previously as pentalyn 269 (500 parts) are mixed and thoroughly shear blended. Ammonium hydroxide solution (26°Be) (135 parts) is admixed and stirred until complete resin solubility is achieved. Paranitroaniline (150 parts) is then added and the mixture is stirred for approximately 10 minutes.

An aluminum sulfate solution is prepared in accordance with the procedure described in Example 6 herein. A portion of the aluminum sulfate solution (1000 parts) is then admixed with the reaction mixture and the entire reaction mixture is cooled to a temperature in the range 100°–110°F. A carbon disulfide emulsion prepared in accordance with the procedure described in Example 1 herein (200 parts) is added. The reaction of carbon disulfide in the procedure of the present example took approximately 45 minutes. Thus, in the present example, the take-up of the carbon disulfide is relatively slow. The remaining portiton of the aluminum sulfate solution (1000 parts) is then admixed therewith, and from this point the procedure followed is identical to the procedure of Example 6 including the diazotizing, and coupling reaction, except that 300 parts of beta-naphthol were used in the coupling reaction of the present example. A finely divided non-bleeding, excellent para-red pigment was produced.

In each of the examples referred to hereinbefore the organic ingredients are substantially quantitatively recovered in the solid substrate.

This invention therefore provides a new method of making diazo dye pigments either by absorbing the coupled dye on the substrate, adding and absorbing either the diazo or naphthol amine moieties on the substrate by addition of the respective moiety to the reaction ingredient in the method of this invention, by addition of these moieties to an uncolored substrate, or by diazotizing the azo intermediate in the presence of the substrate either after the substrate is recovered, or while the substrate is still in the reaction liquor. Furthermore, as illustrated by the above examples, coupling of azo dye intermediates which are respectively absorbed on separate substrates of this invention, and admixing these substrates produces an extremely rapid coupling reaction. As indicated above it has been found that for a given amount of azo dye intermediate, the resulting pigment, when made in the presence of the substrate of this invention, has a higher color value than the color value which would have been achieved from the same amount of intermediate used to manufacture the dye separately prior to absorption on a color-free substrate of this invention or on other substrates.

When tertiary amines or amides are utilized as ingredients to provide the "amine or amide", it is essential that the carbon disulfide be provided in the reaction system as an emulsified carbon disulfide in order to achieve the desired reaction.

To assist one with ordinary skill in the art to practice the invention in its broadest aspects, the following general principles are applicable. As indicated above, it is preferred that the weight of the polymeric material be a major portion of the reaction ingredients. The amount of carbon disulfide which is utilized depends on the amount of amine and other reactive groups which are available in the mixture. To determine a preferred amount of carbon disulfide for use in accordance with the preferred method of this invention, particular amounts of respective selected ingredients from the respective ingredient groups referred to above are admixed, for example, following the general procedure of Example 1, up to the step at which carbon disulfide is added. At that point incremental quantities of carbon disulfide are added (preferably as an aqueous emulsion) while the reaction mixture is maintained at a temperature in the range 100°–110°F. The incremental addition is continued until an odor of carbon disulfide is detectable emanating therefrom.

A record is made of the total amount of carbon disulfide added, and for the purposes of the preferred embodiment of this invention, an amount of carbon disulfide which is between 90 and 110 percent of that total amount of carbon disulfide is the preferred amount. The mixture is heated to 120°F in order to remove any excess, unreacted carbon disulfide.

As indicated above, the polyvalent metal salts are added in water-soluble form, preferably in slightly acidic solutions, and the amount of salt which is added is at least that amount which is necessary to bring about complete precipitation of the substrate of this invention. The amount is not critical, however. An insufficient amount will result in less than quantitative recover of product, and copious excesses of polyvalent metal salts can be added without detrimental effect. It is to be understood, of course, that metals which are knwon to be antagonistic to a particular dye should not be used in the manufacture of substrates which are intended for use with that particular dye.

This invention provides a substrate which exhibits extremely efficient fixing of colorants, colorant intermediates, optical brighteners, ultra-violet absorbers, and the like. By fixing is means absorption or bonding whether physical or chemical with the result that the fixed material is substantially removed from a medium, and is substantially adhered to the substrate. Ultraviolet light inhibitors or absorbers which are absorbed on the substrate of the present invention include the benzophenones, benzotriazols, silicates, and others including resorcinol monobenzoate, hexamethylphosphoric triamide, substituted acrylonitriles, and metal organic complexes. For example, 4-methoxy-2-hydroxybenzophenone, 4-octyloxy-2-hydroxybenzophenone, 4-dodecyloxy-2-hydroxybenzophenone, 2,4-dihydroxybenzophenone, 4-methoxy-2,2'-dihydroxybenzophenone, 4-octyloxy-2,2'-dihydroxybenzophenone, 4-methoxy-2-hydroxy-5-carboxybenzophenone, 4-methoxy-2-hydroxy-5-sulfobenzophenone trihydrate, 2,4-dibenzoylresorcinol, 5-chloro-2-hydroxybenzophenone, 4,4'-dimethoxy-2,2'-dihyroxybenzophenone, 2,2', 4,4'-tetrahydroxybenzophenone, 4-methoxy-2-hydroxybenzophenone-5-sulfonic acid, sodium-4,4'-dimethoxy-2,2'-dimethoxy-5-sulfo-benzophenone, 2(2'hydroxy-5'-methylphenyl)-benzotriazole, alkylated (2'-hydroxy-5'-phenyl) benzotriazoles, phenyl salicylate, 4-5-butylphenyl salicylate, p-octylphenyl salicylate.

Fluorescent whitening agents and brighteners are also efficiently fixed on the substrate of the present invention. For example, the stilbene derivatives and equivalent materials conventionally used for this purpose and well known to those skilled in this art are efficiently fixed.

While in the foregoing specification various embodiments of the present invention have been described, it will be apparent to those skilled in this art that modifications and variations therefrom may be made without departing from the spirit and scope of this invention. Accordingly, the subject invention is to be limited only by the scope of the appended claims.

I claim:

1. An absorbent composition comprisng an effective amount of the reaction product formed in an alkaline aqueous medium of polyvalent metal ions, amine or amide compound, carbon disulfide, and a major amount of water-dispersible or ammoniacal-dispersible reactive high molecular weight compound or polymer material, wherein the amount of carbon disulfide is sufficient to react with substantially all of the amine or amide.

2. The reaction product of claim 1 wherein the water-dispersible or ammoniacal-dispersible reactive high molecular weight compound or polymer material is selected from the group consisting of polymers of unsaturated carboxylic acid, epoxy, polyamide, alpha cellulose, polyester, soya protein, gelatin, casein, and mixtures thereof.

3. The absorbent composition of claim 1 wherein the amine compounds are alkanol amines.

4. The composition of claim 1 in which the amine or amide compound is selected from the group which includes dicyandiamide; urea; thiourea; 2-alkyl imidazoline in which the alkyl group contains 2–22 carbon atoms; 2-alkyl imidazolines in which the alkyl substituent has 2–22 carbon atoms, and which is also substituted in the 1 position with hydroxy ethyl group; amides of fatty acids having 2–20 carbon atoms; primary, secondary and tertiary aliphatic amines having 8–18 carbon atoms; aliphatic diamines; 1, 3-propylene diamine; N-tallow-1, 3 propylene diamine; hydroxy amines; 2-(2-amino ethoxy)ethanol, amino ethanolamine and monethanolamine; aniline, toluidine and xylidene; cyclohexylamine and dicyclohexylamine; phenol diethanolamine; phenol ethylethanolamine, and N-tolyl diethanolamine, and mixtures thereof.

5. The reaction product of claim 1 wherein the product is produced in a reaction system in which the carbon disulfide is added as an emulsion in water.

6. The absorbent composition of claim 1 in which the water-dispersible or ammoniacal-dispersible reactive high molecular weight compound or polymer material is selected from the group consisting of aliphatic unsaturated carboxylic acids having at least one carboxyl group per molecule and two or more unsaturations per molecule, and polymers of compounds having two or more carboxyl groups per molecule and at least one aliphatic unsaturation per molecule.

7. An absorbent composition comprising an effective amount of the reaction product formed in an alkaline aqueous medium of polyvalent metal ions, amine or amide compound, carbon disulfide, and a major amount of water-dispersible copolymer of styrene and maleic anhydride, wherein the weight of the water-dispersible copolymer is greater than the combined weight of the amine or amide compound and carbon disulfide, and wherein said amine or amide compound is used in an amount sufficient to provide at least 5 percent by weight based on the weight of the copolymer used, and in which the carbon disulfide is used in an amount sufficient to react with substantially all of said amine or amide.

8. The absorbent composition of claim 7 wherein the water-dispersible reactive polymeric material is selected from the group consisting of low molecular weight copolymers of styrene and maleic anhydrides.

9. The absorbent composition of claim 8 wherein said copolymers have a molecular weight from 1600 to 2200.

10. The absorbent composition of claim 7 wherein said product is formed in said alkaline aqueous medium by first admixing said polyvalent metal ions, said amine or amide compound, and said major amount of copolymers of styrene and maleic anhydride, and thereafter admixing said carbon disulfide in an amount sufficient to react with substantially all of said amine or amide.

11. The absorbent composition of claim 10 wherein a water soluble silicate is also present in said aqueous alkaline medium.

12. An absorbent composition comprising an effective amount of the reaction product formed in an alkaline aqueous medium by first admixing polyvalent metal ions, amine or amide compound, and a major amount of water-dispersible copolymer of styrene and maleic anhydride, and admixing carbon disulfide with the preceding ingredients at a temperature in the range 100°–110°F., wherein the amount of water-dispersible copolymer is greater than the combined weight of said amine or amide and carbon disulfide, wherein the amount of said amine or amide is at least 5 percent based on the weight of the copolymer, and wherein the amount of carbon disulfide is sufficient to react with substantially all of the amine or amide.

* * * * *

UNITED STATES PATENT AND TRADEMARK OFFICE
CERTIFICATE OF CORRECTION

PATENT NO. : 3,883,438
DATED : May 13, 1975
INVENTOR(S) : Robert K. Remer

It is certified that error appears in the above-identified patent and that said Letters Patent are hereby corrected as shown below:

```
Column 3, line 62, "and" should read --the--
Column 4, lines 34 and 35 "(percent) should read --%--
Column 5, line 1, "N-Tallow" should read --N-tallow--
Column 5, line 2, after "Adogen" insert --)--
Column 6, line 20, "anti-forming" should read --anti-foaming--
Column 6, line 23, "Be" should read --Be'--
Column 7, line 33, "Be" should read --Be'--
Column 7, line 62, "200" should read --2000--
Column 7, line 62, "120°C" should read --120°F--
Column 8, line 14, "Be" should read --Be'--
Column 9, line 10, "Be" should read --Be'--
Column 9, line 56, "Be" should read --Be'--
Column 10, line 22, "Be" should read --Be'--
Column 11, line 3, "Be" should read --Be'--
Column 11, line 39, "Be" should read --Be'--
Column 12, line 52, "mixed" should read --admixed--
Column 12, line 54, "Be" should read --Be'--
```

Signed and Sealed this seventeenth Day of February 1976

[SEAL]

Attest:

RUTH C. MASON
*Attesting Officer*

C. MARSHALL DANN
*Commissioner of Patents and Trademarks*